Oct. 7, 1969
A. MARTIN
3,471,228
MOTION PICTURE APPARATUS
Filed Sept. 8, 1966
2 Sheets-Sheet 1
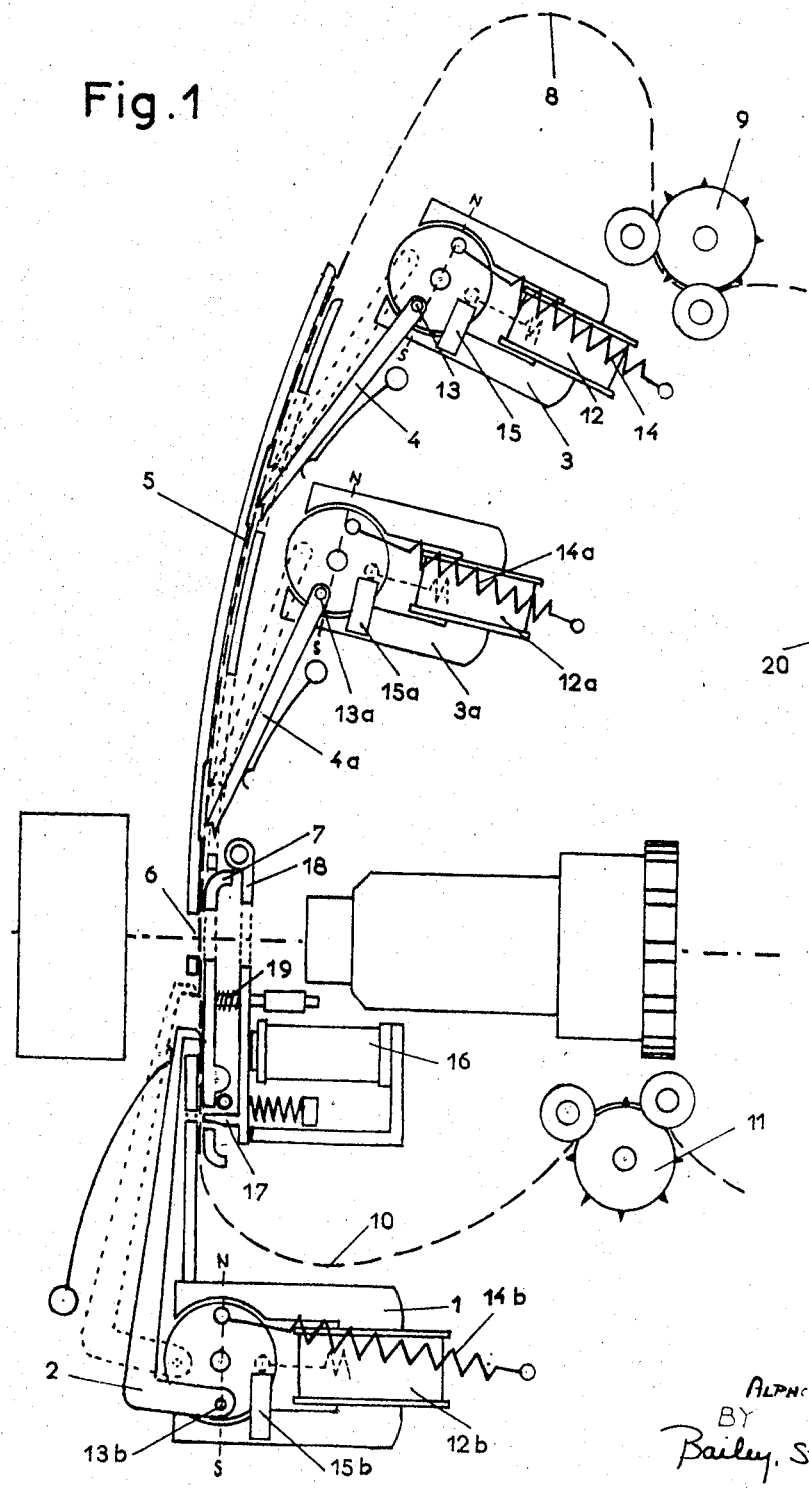
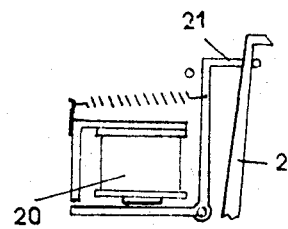
INVENTOR
ALPHONSE MARTIN
BY
Bailey, Stephens & Huettig
ATTORNEY

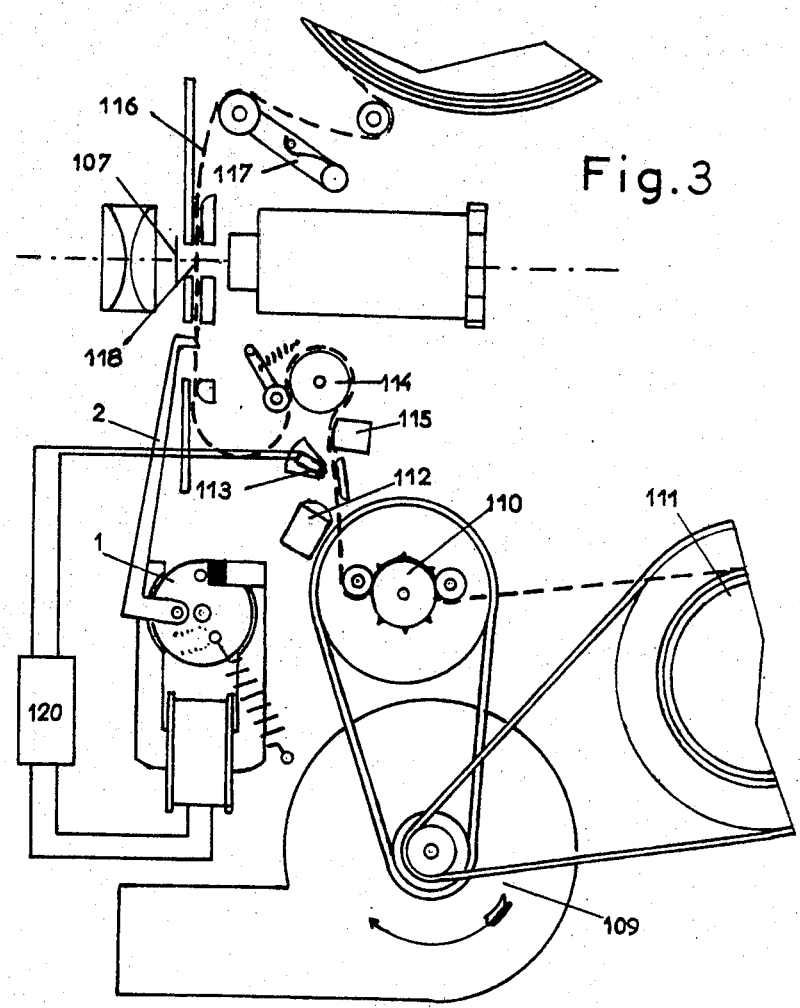
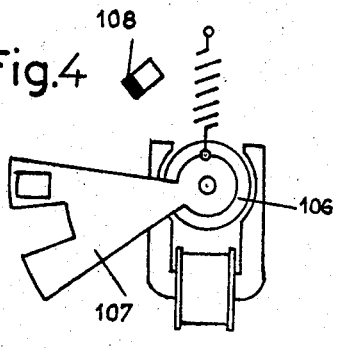
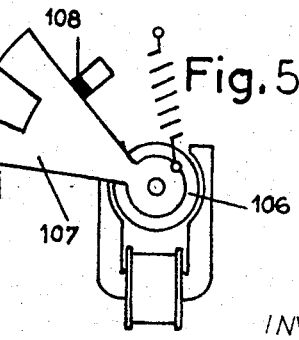

United States Patent Office 3,471,228
Patented Oct. 7, 1969

3,471,228
MOTION PICTURE APPARATUS
Alphonse Martin, 4 Place de la Republique,
Saint-Ouen, Seine-St.-Denis, France
Filed Sept. 8, 1966, Ser. No. 577,982
Claims priority, application France, Sept. 8, 1965, 30,740;
May 13, 1966, 61,412
Int. Cl. G03b 1/22
U.S. Cl. 352—191      6 Claims

ABSTRACT OF THE DISCLOSURE

A motion picture projector has a drive mechanism comprising a plurality of drive claws. One claw is located on one side of the film gate and pulls the film. The additional claws are located on the opposite side of the gate and push the film. Each claw has an independent electric drive such as a rotary solenoid. All of the electric drives are operated by the same signal.

---

In my prior patent application S.N. 350,422, filed Mar. 9, 1964, now U.S. Patent No. 3,357,780 granted Dec. 12, 1967, I disclosed a device for recording a motion picture film which made use of the sound recording on a smooth magnetic strip provided with markings or signs corresponding each to the shifting from one picture to the next one.

The sound recording device was of the magnetic type and it was provided with an optical reading head which produced an electrical pulse on every passage of a picture shifting marking or sign, this pulse being sent to the camera to energize an electro-magnet adapted to operate the pulling-down claw for shifting the film from a position corresponding to one picture to the position corresponding to the next picture.

This device made it possible to operate the camera without utilizing, in the usual manner, a mechanical or electrical motor, which required regulating means, and it made it possible to produce a direct sound moving picture recording with perfect synchronization.

A similar arrangement permits of devising a motion picture projector with a driving mechanism analogous to that of the camera above referred to, i.e. with the magnetic strip producing pulses for controlling the shifting from one picture to the next one.

A first object of the present invention is to obtain a very quick downward movement of the film in a moving picture apparatus, practically without any risk of injury thereof and without subjecting it to stresses even if the intervals between the perforation thereof have undergone variations due to shrinkage or to unsatisfactory gluing of film portions.

Another object of the present invention is to provide a motion picture projector where the shifting from one picture to the next one is controlled by a sound track carried by the film.

Preferred embodiments of the present invention will be hereinafter described with the reference to the appended drawings, given merely by way of example, and in which:

FIG. 1 shows a film driving mechanism making use of three claws.

FIG. 2 shows a magnetic device for disengaging the main claw of the system.

FIG. 3 shows a motion picture projector made according to an embodiment of the invention.

FIGS. 4 and 5 show the shutter of said projector in two different positions, respectively.

The film driving claws of the mechanism are driven by electro-magnets of the type described in my above mentioned prior patent. The first electro-magnet 1 (FIG. 1) drives the main claw 2, whereas the electro-magnets 3 and 3a drive the secondary claws 4 and 4a.

The film passes first in loosely guiding passage 5, which does not comprise a pressure plate and, then, between projection aperture 6 and pressure plate 7.

The three claws 2, 4 and 4a are actuated simultaneously by the same electrical pulse and simultaneously exert a pulling effort on three different perforations of the film, the pulling action of each claw being independent of that of the others and the friction of the film in its passages being reduced to a minimum.

The operation is as follows:

Film 8, carried by a spool (not shown), passes on cog-wheel 9 which maintains the upper loop of the film. Then this film passes through the loosely guiding passage 5, the cross section of which is greater than that corresponding to a portion of the film where two portions thereof have been glued on each other. Then the film passes between projection aperture 6 and pressure plate 7, after which it forms the lower loop 10 and passes on cog-wheel 11 before being wound upon a receiving spool (not shown).

On every pulse produced by the reading of a magnetic strip carrying marks corresponding to picture pulses (or by the action of a mechanical switch or other device for controlling the shifting of pictures), the three claws 2, 4 and 4a simultaneously drive the film through a distance corresponding to one picture.

Secondary claws 4 and 4a exert a pushing action to drive the film, and they also push it against the concave surface of passage 5, of curved shape, whereby the film, during its displacement, is applied against said concave surface and does not assume an irregular shape.

The operation of the claws is as follows: On every pulse, the energizing of coils 12, 12a and 12b causes the cylindrical rotary members housed in electro-magnets 1, 3 and 3a to turn through 90°. Crank-pins 13, 13a and 13b drive claws 4, 4a and 2 which cause the film to move down, on every pulse, through a distance corresponding to a picture.

These mechanisms are combined so that the claws are at the end of their motive stroke when crank-pins 13, 13a and 13b reach their dead center positions. Thus the driving mechanism means do not produce shocks at the ends of their strokes, even when the dead center position has been passed over. After this, springs 14, 14a and 14b return the rotary members and the claws to their positions of rest.

In order to prevent any oscillation to occur in the position of stopping, abutments 15, 15a and 15b of a resilient material are provided.

Advantageously, secondary claws 4 and 4a have a stroke slightly shorter than that of main claw 2. Thus, on every pulse, the three electro-magnets, which are connected for instance in parallel, will produce simultaneously the drive of the film, every claw acting upon a different perforation, respectively. The pushing actions of the two secondary claws 4 and 4a will stop shortly before the stopping of the film and the main claw 2, which takes advantage of the momentum of the film, will determine the final position thereof.

Rotation of cog-wheels 9 and 11, and also of the spool upon which the film is wound, will be produced by a step by step or synchronous motor (not shown), this motor being piloted by the circuit of the picture pulses. It is also possible to use the system of rewinding for a camera described in my above mentioned prior patent.

The projector according to the present system may include no shutter, because the very quick image shifting is practically not visible, which permits of obtaining a high luminosity.

The system may further comprise an electro-magnet 16 connected with the circuit through which the pulses are transmitted, so that, simultaneously with the downward movements of the claws, said electro-magnet 16 disengages registration pin 17, from the perforatinos of the film, whereas plate 18 releases the spring 19 of pressure plate 7. At the end of the pulse, when the film is stationary, registration pin 17 engages into another of perforation, thus locking the film in position and compressing the spring 19 of pressure plate 7.

The claws may be subjected to the action of a device as shown by FIG. 2. On every pulse, electro-magnet 20 releases claw 2 which engages into a film perforation. When the pulse is ended, arm 21 pulls out the claw from the perforation, so that said claw, during its upward movement, will have no contact with the film.

The oscillating members shown by the drawing may be replaced by bipolar wound rotors receiving current during the pulses at the same time as the stationary winding of the stators.

The electro-magnets driving a cylindrical moving member may, if necessary, be replaced by other electro-mechanical means, for instance by those described in my above mentioned prior patent.

The system above described is particularly advantageous for tele-cinema apparatus intended for television transmission. Of course, a system as above described, including three claws, has been given merely by way of example. It might make use of only two claws or, on the contrary, include four or more claws. The secondary claws may be disposed partly ahead of the main claw and partly after it.

The system above described is practically suitable for camera recording television transmissions, the pulses being supplied by the picture signal of the television system.

FIGS. 3, 4 and 5 disclose means for controlling a motion picture projector from the unwinding of a sound track.

This sound track supplies pulses, which, for instance, will be amplified by a push-pull electronic amplifier which will deliver alternately positive and negative pulses.

In the embodiment shown by the drawings, the positive pulses are used to control the operation of electro-magnet 1 which causes the downward shifting movement of the film from a position corresponding to one picture to the position corresponding to the next picture. The negative pulses serve to control shutter 107. This shutter 107 is carried by a rotary part 106 driven by an electro-magnet and it produces three openings for the light beam on every pulse, which permits of obtaining projection without flickering. Abutment 108 limits the displacement of the shutter and prevents mechanical resonance thereof.

This mechanism permits of performing direct sound and light projections with a perfect synchronism.

An electrical motor 109 drives cog-wheel 110 and the receiving spool 111 on which the film is rewound.

The optical reading head consists of lamp 112 and photo-diode 113.

The film-driven wheel 114 is rigid with a fly-wheel (not shown). Magnetic head 115 reproduces the sound.

This device works as follows: Film 116 passes over the roller carried at the end of resiliently biased arm 117. It passes in front of projection aperture 118, then, over wheel 114, comes into contact with magnetic head 115 which reproduces the sound, and comes opposite optical reading head 112–113 which transmits a pulse on every passage of a perforation of the film. This pulse is sent to amplifier 120, the output of which is connected to the electro-magnet which controls claw 2. The film is pulled by cog-wheel 110 and rewound on receiving spool 111.

This device permits of projecting the pictures of a film carrying a sound track at a regular speed so that the sound reproduction is perfect.

Optical reading of the film perforations may be replaced by a cog-wheel producing a mechanical switching to operate the film pulling means, as specified in my above mentioned prior patent.

In a general manner, while the above description discloses what I deem to be practical and efficient embodiments of the present invention, said invention is not limited thereto as there might be changes made in the arrangement, disposition and form of the parts without departing from the principle of the invention as comprehended within the scope of the appended claims.

What I claim is:

1. A motion picture apparatus which comprises, in combination,
   a gate,
   means for guiding a motion picture film provided with perforations along a path transverse to the axis of said gate,
   at least two claws for engaging two different perforations of said film to propel it along said path,
   and two electro-motor means, independent of each other, adapted to be operated both by the same signal for operating said claws, respectively.

2. An apparatus according to claim 1 wherein each of said electro-motor means comprises a rotary member pivotally connected with one of said claws, respectively, for driving it, and an electro-magnet having branches surrounding said rotary member, further comprising resilient means for returning said rotary members to their positions of rest when said electro-magnets are not energized.

3. An apparatus according to claim 1 further comprising resilient biasing means for resiliently biasing said claws towards said film to engage said perforations, and pulling means for pulling each of said claws out of said film perforations, and an electro-magnet for operating each of said pulling means, said last mentioned electro-magnets being fed with current during said signal to pull out said claws when said claws are operated.

4. A motion picture projector which comprises, in combination,
   driving means for moving with a continuous motion a motion picture film carrying a sound record,
   sound reading means adapted to co-operate with said sound record, in a region in which said film moves with continuous motion, for reading said sound record,
   at least one claw for imparting intermittent displacements to a portion of said film upstream of said driving means,
   and means for forming a loop of film between the portion of the film subjected to continuous motion and the portion of the film subjected to intermittent displacements,
   electro-motor means for actuating said claw,
   and sensing means responsive to the continuous motion of said film between said loop and said driving means for controlling said electro-motor means,
   said electro-motor means including a rotary member to which said claw is connected, said rotary member being adapted to oscillate, the movement in one direction of the oscillation corresponding to an intermittent displacement of the film, and the movement in the opposite direction corresponding to the return of the rotary member and of the claw to their position of rest,
   and said sensing means being adapted to produce a series of pulses, each pulse of the series controlling said electro-motor means to move in said one direction for displacing the film from a position corresponding to one picture to a position corresponding to the next picture.

5. A motion picture projector according to claim 4 wherein said film is provided with markings at regular intervals and said sensing means comprise photo-electric means responsive to the passage of said markings, and an amplifier having its input connected to the output of said photo-electric means, the output of said amplifier being connected with said electro-motor means to control them.

6. A motion picture projector according to claim 5 wherein said markings consist of perforations of said film.

References Cited

UNITED STATES PATENTS

| | | | |
|---|---|---|---|
| 1,910,995 | 5/1933 | Leventhal | 352—29 X |
| 2,349,941 | 5/1944 | Cramwinckel | 226—27 |

NORTON ANSHER, Primary Examiner

M. H. HAYES, Assistant Examiner

U.S. Cl. X.R.

352—29, 168